United States Patent Office 2,734,061
Patented Feb. 7, 1956

2,734,061

PRODUCTION OF COMPOUNDS OF THE PYRIDINE SERIES

Walter Reppe, Heinrich Pasedach, and Matthias Seefelder, Ludwigshafen (Rhine), Germany, assignors to Badische Anilin- & Soda-Fabrik Aktiengesellschaft, Ludwigshafen (Rhine), Germany No Drawing. Application May 18, 1953,
Serial No. 355,847

Claims priority, application Germany May 31, 1952

7 Claims. (Cl. 260—290)

This invention relates to an improved process for the production of compounds of the pyridine series, especially of the pyridine itself and the picolines.

We have found that compounds of the pyridine series are obtained in good yields by heating mono- or dioximes of glutaric dialdehydes or δ-ketoaldehydes together with an excess of strong aqueous acids as quickly as possible to temperatures between about 90 and 220° C.

Mono- and dioximes of glutaric dialdehydes or δ-ketoaldehydes may be prepared by known methods from glutaric dialdehydes or δ-ketoaldehydes or from their acetals, in particular from their cyclic enol acetals, i. e. the 2-alkoxy-2,3-dihydropyranes, or from the corresponding 2-acyloxy-2,3-dihydropyranes by reacting them with hydroxylammonium salts. The 2-alkoxy-2,3-dihydropyranes are known to be readily accessible by diene synthesis from vinyl ethers and α,β-unsaturated carbonyl compounds, for example 2-methoxy-2,3-dihydropyrane from acrolein and methyl vinyl ether, 2-ethoxy-4-methyl-2,3-dihydropyrane from crotonaldehyde and ethyl vinyl ether, 2-methoxy-5-methyl-2,3-dihydropyrane from α-methlacrolein and methyl vinyl ether or 2-methoxy-6-methyl-2,3-dihydropyrane from vinyl methyl ketone and methyl vinyl ether. The 2-acyloxy-2,3-dihydropyranes are obtained in a corresponding manner from vinyl esters and α,β-unsaturated carbonyl compounds, as for example 2-acetoxy-2,3-dihydropyrane from vinyl acetate and acrolein.

Glutaric dialdehydes or their acetals which have been prepared in other ways, as for example by reduction of glutaric acid derivatives, can obviously also be used as initial materials to react them with hydroxylammonium salts.

The mono- or dioximes of the glutaric dialdehydes may be introduced in solid or fused condition or in aqueous solution into an aqueous solution of a strong acid kept at a temperature above 90° C., or more simply into a boiling solution, while stirring, care being taken that an excess of acid is always present. A solution of the oxime in an excess of acid which has been prepared at room temperature may also be passed through a heated tube which is preferably provided with filler bodies, care being taken that the solution is heated as rapidly as possible to a temperature above 90° C. This last-mentioned manner of operation may be carried out especially advantageously under pressure.

As strong acids there may be mentioned for example hydrochloric acid, phosphoric acid, sulfuric acid or organic sulfonic acids, as for example toluene sulfonic acids or paraffin sulfonic acids.

By the above methods there may be obtained in good yields from initial materials which are readily accessible technically, pyridine itself and also pure pyridine homologues, such as α-, β- or γ-alkylpyridines or other compounds of the pyridine series which are free from isomers. The compounds of the pyridine series are valuable intermediate products, in particular for pharmaceutical products.

Pyridine bases have already been prepared by treating 2-alkoxy-2,3-dihydropyranes with ammonia at 300° to 450° C. (see U. S. patent specification No. 2,528,978). The yields are, however, unsatisfactory. Attempts have also already been made to convert glutaric dialdehyde oximes into pyridine bases by gradually heating to boiling a mixture of oximes and mineral acid (see Berichte der deutschen Chem. Ges., volume 46 (1913), page 110, and Journal of the Chemical Society, London 1937, page 300). In this way, however, yields of pyridine bases higher than about 20% of the theoretical yield have never been obtained and in the main tarry masses are formed. In contrast, the process according to the present invention gives yields of 50 to 80% or more of the theoretical yield of pyridine bases.

The following examples will further illustrate this invention but the invention is not restricted to these examples; the parts are parts by weight.

Example 1

100 parts of crystallised glutaric dialdehyde dioxime are introduced during the course of 2 hours into a boiling mixture of 150 parts of concentrated hydrochloric acid and 450 parts of water. The reaction mixture is then made alkaline, the pyridine is distilled off together with water and isolated from the distillate in the usual way. The yield is 35 parts, equivalent to 56% of the theoretical yield.

If the same amount of the dioxime be dissolved in the above-mentioned amount of hydrochloric acid and the mixture be heated to boiling in the usual way, there are obtained, after boiling for 2 hours and working up in the usual way, only 12.5 parts of pyridine, corresponding to about 21% of the theoretical yield.

Example 2

An acid aqueous solution of 118 parts of β-methylglutaric dialdehyde mono-oxime (prepared for example by dissolving 142 parts of 2-ethoxy-4-methyl-2,3-dihydropyrane in a mixture of 25 parts of concentrated hydrochloric acid and 500 parts of water and adding 70 parts of hydroxylammonium chloride) are charged through a tubular coil heated externally to about 120° C. with xylene vapour during the course of 2 hours. 58 parts of γ-picoline are obtained corresponding to a yield of 62%.

Example 3

An acid aqueous solution of 118 parts of α-methylglutaric dialdehyde mono-oxime (prepared by dissolving 142 parts of 2-ethoxy-5-methyl-2,3-dihydropyrane in a mixture of 25 parts of conc. hydrochloric acid and 500 parts of water and adding 70 parts of hydroxylammonium chloride) are charged through a heated tubular coil as described in Example 2. There are obtained 55 parts of β-picoline.

Example 4

59 parts of 1,5-dioxohexane dioxime (prepared from 2-methoxy-6-methyl-2,3-dihydropyrane and hydroxylammonium chloride) are introduced, as described in Example 1, into a boiling 30 percent aqueous solution of phosphoric acid. Pure α-picoline is obtained in good yields.

What we claim is:

1. Process for the production of pyridine and its homologues which comprises heating a member of the group consisting of the mono- and dioximes of glutaric dialdehyde, of methyl glutaric dialdehyde and of 1,5-dioxohexane with an excess of a strong aqueous acid selected from the group consisting of hydrochloric, phosphoric, sulphuric and organic sulphonic acids as quickly as possible to temperatures between about 90 and 220° C.

2. Process for the production of pyridine and its homologues which comprises introducing a member of the group consisting of the mono- and dioximes of glutaric dialdehyde, of methyl glutaric dialdehyde and of 1,5-dioxohexane into a boiling aqueous solution of an excess of a strong acid selected from the group consisting of hydrochloric, phosphoric, sulphuric and organic sulphonic acids.

3. Process for the production of pyridine which comprises introducing glutaric dialdehyde dioxime into a boiling aqueous solution of an excess of hydrochloric acid.

4. Process for the production of γ-picoline which comprises charging an acid aqueous solution of β-methyl-glutaric dialdehyde oximes containing an excess of hydrochloric acid through a tubular reaction zone heated to about 120° C.

5. Process for the production of β-picoline which comprises charging an acid aqueous solution of α-methyl glutaric dialdehyde oximes containing an excess of hydrochloric acid through a tubular reaction zone heated to about 120° C.

6. Process for the production of α-picoline which comprises introducing 1,5-dioxohexane dioxime into a boiling aqueous solution of an excess of a strong acid selected from the group consisting of hydrochloric, phosphoric, sulphuric and organic sulphonic acids.

7. Process for the production of pyridine and its homologues which comprises subjecting a member of the group consisting of mono- and dioximes of glutaric dialdehyde, of methyl glutaric dialdehyde and of 1,5-dioxohexane with an excess of a strong aqueous acid selected from the group consisting of hydrochloric, phosphoric, sulphuric and organic sulphonic acids to an initial reaction temperature between about 90° and 220° C. and maintaining the temperature of the reaction within said range.

References Cited in the file of this patent

UNITED STATES PATENTS 2,528,978    Smith et al. _____ Nov. 7, 1950

OTHER REFERENCES

Shaw: J. Chem. Soc. 1937, pp. 300–2.